United States Patent
Ito et al.

(10) Patent No.: US 9,525,169 B2
(45) Date of Patent: Dec. 20, 2016

(54) NICKEL-HYDROGEN STORAGE BATTERY

(71) Applicant: PRIMEARTH EV ENERGY CO., LTD., Kosai-shi, Shizuoka (JP)

(72) Inventors: Shinichiro Ito, Kosai (JP); Yuki Sakito, Toyohashi (JP); Hiroyuki Sakamoto, Toyohashi (JP); Katsumi Kashiwagi, Nara (JP)

(73) Assignee: PRIMEARTH EV ENERGY CO., LTD., Kosai-Shi (JP)

( * ) Notice: Subject to any disclaimer, the term of this patent is extended or adjusted under 35 U.S.C. 154(b) by 308 days.

(21) Appl. No.: 14/225,172

(22) Filed: Mar. 25, 2014

(65) Prior Publication Data

US 2015/0044562 A1 Feb. 12, 2015

(30) Foreign Application Priority Data

Aug. 7, 2013 (JP) .................. 2013-163937

(51) Int. Cl.
*H01M 4/38* (2006.01)
*H01M 10/30* (2006.01)
*H01M 10/42* (2006.01)

(52) U.S. Cl.
CPC ............ *H01M 4/385* (2013.01); *H01M 10/30* (2013.01); *H01M 2010/4292* (2013.01); *Y02E 60/124* (2013.01)

(58) Field of Classification Search
CPC ................... H01M 4/383; H01M 4/385
See application file for complete search history.

(56) References Cited

U.S. PATENT DOCUMENTS

| 8,119,284 B2 | 2/2012 | Ito et al. |
| 2003/0091903 A1* | 5/2003 | Sato .................. H01M 2/1653 |
| | | 429/249 |
| 2005/0100789 A1 | 5/2005 | Murata et al. |
| 2008/0160408 A1* | 7/2008 | Ito ........................ H01M 4/38 |
| | | 429/218.2 |

FOREIGN PATENT DOCUMENTS

| CN | 1607690 A | 4/2005 |
| EP | 2 086 037 A2 | 8/2009 |
| JP | 2008-166027 A | 7/2008 |

OTHER PUBLICATIONS

CN Office Action dated Apr. 5, 2016 as received in Application No. 201410109872.1.

* cited by examiner

*Primary Examiner* — Maria J Laios
(74) *Attorney, Agent, or Firm* — Maschoff Brennan

(57) ABSTRACT

A nickel-hydrogen storage battery includes a positive electrode, a negative electrode using an $AB_5$ based hydrogen-absorbing alloy, and a separator arranged between the positive and negative electrodes. The $AB_5$ based hydrogen-absorbing alloy includes an A element, which is a constituent element of a misch metal, and a B element, which includes nickel and cobalt. The ratio of the amount of substance of the B element to that of the A element is 5.2 or more and 5.4 or less. The ratio of the amount of substance of cobalt to that of the A element is 0.15 or more and 0.4 or less. The liquid retention volume (V1) and the true volume (V2) of the separator, the theoretical capacity of the negative electrode (C1), and the theoretical capacity of the positive electrode (C2) satisfy the following expression.

$$2.0 \leq V1/V2 \times C1/C2 \leq 3.1$$

6 Claims, 1 Drawing Sheet

# NICKEL-HYDROGEN STORAGE BATTERY

BACKGROUND OF THE INVENTION

The technique of the present disclosure relates to a nickel-hydrogen storage battery.

Conventionally, a hydrogen-absorbing alloy has been used as a negative electrode material for a nickel-hydrogen storage battery. The hydrogen-absorbing alloy absorbs hydrogen during charging of the nickel-hydrogen storage battery and releases hydrogen during discharging of the nickel-hydrogen storage battery. The volume of the hydrogen-absorbing alloy expands or contracts in association with the absorption or the release of hydrogen. The hydrogen-absorbing alloy is pulverized as a result of the expansion and the contraction of the volume. The pulverization of the hydrogen-absorbing alloy brings about an increase in internal resistance of the nickel-hydrogen storage battery, and thereby the output of the nickel-hydrogen storage battery is reduced. An $AB_5$ based alloy is mainly used as the hydrogen-absorbing alloy. An alloy containing cobalt is used among the $AB_5$ based alloys for the purpose of suppressing the pulverization. A nickel-hydrogen storage battery in which the durability of the hydrogen-absorbing alloy is improved by suppressing the pulverization while the amount of expensive cobalt is reduced is disclosed in Japanese Laid-Open Patent Publication No. 2008-166027.

However, since the expansion and contraction of the hydrogen-absorbing alloy during charging and discharging of the nickel-hydrogen storage battery are unavoidable, the pulverization of the hydrogen-absorbing alloy is unavoidable. Moreover, when the ratio of the theoretical capacity of the negative electrode to the theoretical capacity of the positive electrode is made small in order to improve the weight energy density, the load of the negative electrode is increased and thereby the pulverization of the hydrogen-absorbing alloy is accelerated. Therefore, it is desired to suppress the increase in the internal resistance of the nickel-hydrogen storage battery attributable to the pulverization of the hydrogen-absorbing alloy.

SUMMARY OF THE INVENTION

An objective of the technique of the present disclosure is to provide a nickel-hydrogen storage battery in which an increase in internal resistance attributable to the pulverization of a hydrogen-absorbing alloy is suppressed.

The present inventors have made diligent studies on the increase in the internal resistance of a nickel-hydrogen storage battery using a hydrogen-absorbing alloy as a negative electrode. As a result thereof, the present inventors have found out that the increase in the internal resistance is not caused by the change of the structure (deterioration) due to the pulverization of the hydrogen-absorbing alloy. A newly formed surface is formed on the hydrogen-absorbing alloy by the pulverization of the hydrogen-absorbing alloy. An electrolytic solution is consumed by the newly formed surface and thereby the electrolytic solution runs short. The increase in the internal resistance of the nickel-hydrogen storage battery is mainly caused by the shortage of the electrolytic solution.

To achieve the foregoing objective and in accordance with one aspect of the present disclosure, a nickel-hydrogen storage battery is provided that includes a positive electrode, a negative electrode using an $AB_5$ based hydrogen-absorbing alloy, and a separator arranged between the positive electrode and the negative electrode. The $AB_5$ based hydrogen-absorbing alloy includes an A element, which is a constituent element of a misch metal, and a B element. The B element includes nickel and cobalt. A ratio of an amount of substance of the B element to an amount of substance of the A element is 5.2 or more and 5.4 or less. A ratio of an amount of substance of cobalt to the amount of substance of the A element is 0.15 or more and 0.4 or less. A liquid retention volume (V1), which is a volume of an electrolytic solution retained in the separator, a true volume (V2), which is a volume of the separator in the case where no void exists in the separator, a theoretical capacity of the negative electrode (C1), and a theoretical capacity of the positive electrode (C2) satisfy the expression (1).

$$2.0 \le V1/V2 \times C1/C2 \le 3.1 \tag{1}$$

In accordance with another aspect, a nickel-hydrogen storage battery is provided that includes a positive electrode, a negative electrode using an $AB_5$ based hydrogen-absorbing alloy, and a separator arranged between the positive electrode and the negative electrode. The $AB_5$ based hydrogen-absorbing alloy includes an A element, which is a constituent element of a misch metal, and a B element. The B element includes nickel and cobalt. A ratio of an amount of substance of the B element to an amount of substance of the A element is 5.25 or more and 5.4 or less. A ratio of an amount of substance of cobalt to the amount of substance of the A element is 0.05 or more and 0.15 or less. A ratio of a half-width of a peak of a (002) plane to a half-width of a peak of a (200) plane in X-ray diffraction is 1.1 or more and less than 1.3. A liquid retention volume (V1), which is a volume of an electrolytic solution retained in the separator, a true volume (V2), which is a volume of the separator in the case where no void exists in the separator, a theoretical capacity of the negative electrode (C1), and a theoretical capacity of the positive electrode (C2) satisfy the expression (1).

$$2.0 \le V1/V2 \times C1/C2 \le 3.1 \tag{1}$$

In accordance with a further aspect, a nickel-hydrogen storage battery is provided that includes a positive electrode, a negative electrode using an $AB_5$ based hydrogen-absorbing alloy, and a separator arranged between the positive electrode and the negative electrode. The $AB_5$ based hydrogen-absorbing alloy includes an A element being a constituent element of a misch metal, and a B element. The B element includes nickel and cobalt. A ratio of an amount of substance of the B element to an amount of substance of the A element is 5.30 or more and 5.4 or less. A ratio of an amount of substance of cobalt to the amount of substance of the A element is 0.05 or more and 0.15 or less. A ratio of a half-width of a peak of a (002) plane to a half-width of a peak of a (200) plane in X-ray diffraction is 1.1 or more and less than 1.9. A liquid retention volume (V1), which is a volume of an electrolytic solution retained in the separator, a true volume (V2), which is a volume of the separator in the case where no void exists in the separator, a theoretical capacity of the negative electrode (C1), and a theoretical capacity of the positive electrode (C2) satisfy the expression (1).

$$2.0 \le V1/V2 \times C1/C2 \le 3.1 \tag{1}$$

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, a nickel-hydrogen storage battery according to one embodiment of the present disclosure will be described with reference to FIGS. 1 and 2.

Figure 1:
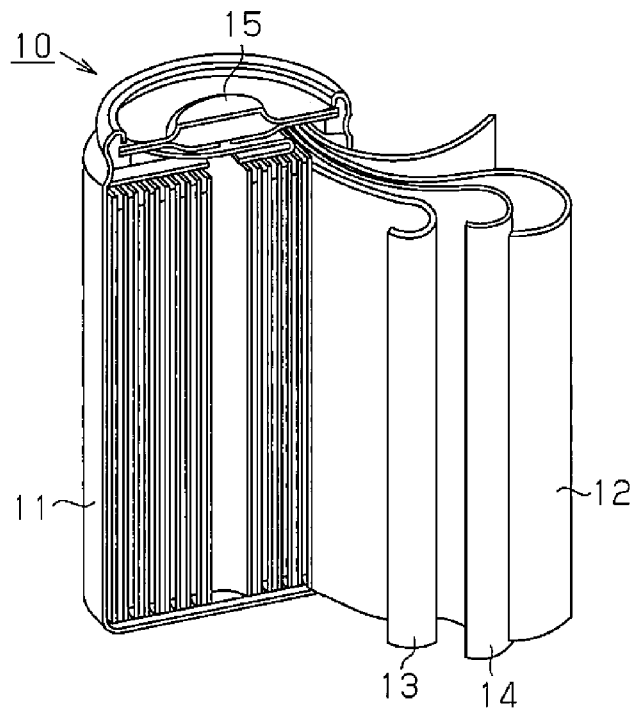
FIG. 1 is a diagram schematically illustrating a nickel-hydrogen storage battery according to one embodiment of the technique of the present disclosure.

As illustrated in FIG. 1, a nickel-hydrogen storage battery 10 includes a case 11, a positive electrode 12, a negative electrode 13, a separator 14, and a sealing plate 15. The positive electrode 12, the negative electrode 13, and the separator 14 are wound in a coil shape to form a pole plate group. The pole plate group and an electrolytic solution not shown in the figure are enclosed in the case 11. The case 11 is sealed by the sealing plate 15.

Except for the negative electrode 13, members used for a general nickel-hydrogen storage battery are used in the nickel-hydrogen storage battery 10. For example, a positive electrode whose main constituent material is nickel hydroxide can be used for the positive electrode 12. A polyolefin nonwoven fabric to which hydrophilic treatment is applied can be used as the separator 14. An alkaline aqueous solution whose main solute is potassium hydroxide, the alkaline aqueous solution having a specific gravity of about 1.3, can be used as the electrolytic solution.

A pole plate including a conductive support and a hydrogen-absorbing alloy supported by the conductive support is used for the negative electrode 13. The hydrogen-absorbing alloy used for the negative electrode 13 will be described below. For example, a punching metal whose surface is plated with nickel can be used for the conductive support. The negative electrode 13 can be produced by applying the support with paste containing the hydrogen-absorbing alloy (and a binding agent as necessary), thereafter drying, rolling and cutting the support. The negative electrode 13 is formed so as to have a capacity ratio (C1/C2), which is the ratio of the theoretical capacity of the negative electrode 13 (C1) to the theoretical capacity of the positive electrode 12 (C2), of 1.2 or more and 1.35 or less ($1.2 \leq C1/C2 \leq 1.35$).

In addition, the theoretical capacity of the positive electrode is calculated based on the weight of nickel hydroxide used by using 289 mAh per 1 g of nickel hydroxide as a constant. The theoretical capacity of the negative electrode is calculated based on the weight of the hydrogen-absorbing alloy used by using 290 mAh per 1 g of hydrogen-absorbing alloy as a constant.

Next, a hydrogen-absorbing alloy powder used for the negative electrode 13 will is described.

The hydrogen-absorbing alloy powder is made from $MmNi_5$ (Mm: misch metal) as an original form, and a part of Ni is substituted by another element (substitution element). The ratio of Ni and the substitution element to the Mm (atom ratio) is 5.2 or more. The misch metal is an alloy of a rare earth element such as La and Ce. At least one element selected from the group consisting of, for example, Co, Mn, Al, Fe, Cu, and Ti can be used as an element that is substituted for Ni. Accordingly, an alloy containing the Mm, Ni, Co, and Al; an alloy containing the Mm, Ni, Co, Al, and Mn; or the like can be used as the hydrogen-absorbing alloy.

When the Mm, which constitutes the hydrogen-absorbing alloy, is represented by A, and the element other than the Mm is represented by B, the $AB_5$ based hydrogen-absorbing alloy satisfies one of the following conditions. The condition 2 to the condition 4 are the same conditions as in the case of the hydrogen-absorbing alloy in Japanese Laid-Open Patent Publication No. 2008-166027.

Condition 1: The ratio of the amount of substance of the B element ($m_B$) to the amount of substance of the A element ($m_A$), namely the molar ratio ($m_B/m_A$) is 5.2 or more and 5.4 or less ($5.2 \leq m_B/m_A \leq 5.4$), and the ratio ($m_{Co}/m_A$) of the amount of substance of cobalt ($m_{Co}$) to the amount of substance of the A element ($m_A$) is 0.15 or more and 0.4 or less ($0.15 \leq m_{Co}/m_A \leq 0.4$).

Condition 2: The ratio ($m_B/m_A$) of the amount of substance of the B element ($m_B$) to the amount of substance of the A element ($m_A$) is 5.25 or more and 5.4 or less ($5.25 \leq m_B/m_A \leq 5.4$), the ratio ($m_{Co}/m_A$) of the amount of substance of cobalt ($m_{Co}$) to the amount of substance of the A element ($m_A$) is 0.15 or more and 0.25 or less ($0.15 \leq m_{Co}/m_A \leq 0.25$), and the ratio ($HW_{(002)}/HW_{(200)}$) of the half-width of the peak of a (002) plane ($HW_{(002)}$) to the half-width of the peak of a (200) plane ($HW_{(200)}$) in X-ray diffraction is 1.3 or more and less than 1.7 ($1.3 \leq HW_{(002)}/HW_{(200)} < 1.7$).

Condition 3: The ratio ($m_B/m_A$) of the amount of substance of the B element ($m_B$) to the amount of substance of the A element ($m_A$) is 5.25 or more and 5.4 or less ($5.25 \leq m_B/m_A \leq 5.4$), the ratio ($m_{Co}/m_A$) of the amount of substance of cobalt ($m_{Co}$) to the amount of substance of the A element ($m_A$) is 0.05 or more and 0.15 or less ($0.05 \leq m_{Co}/m_A \leq 0.15$), and the ratio of the half-width of the peak of a (002) plane ($HW_{(002)}$) to the half width of the peak of a (200) plane ($HW_{(200)}$) in X-ray diffraction is 1.1 or more and less than 1.3 ($1.1 \leq HW_{(002)}/HW_{(200)} < 1.3$).

Condition 4: The ratio ($m_B/m_A$) of the amount of substance of the B element ($m_B$) to the amount of substance of the A element ($m_A$) is 5.30 or more and 5.4 or less ($5.30 \leq m_B/m_A \leq 5.4$), the ratio ($m_{Co}/m_A$) of the amount of substance of cobalt ($m_{Co}$) to the amount of substance of the A element ($m_A$) is 0.05 or more and 0.15 or less ($0.05 \leq m_{co}/m_A \leq 0.15$), and the ratio of the half-width of the peak of a (002) plane ($HW_{(002)}$) to the half-width of the peak of a (200) plane ($HW_{(200)}$) in X-ray diffraction is 1.1 or more and less than 1.9 ($1.1 \leq HW_{(002)}/HW_{(200)} < 1.9$).

In addition, the upper limit of the ratio of the amount of substance of the B element to the amount of substance of the A element is set to 5.4 in the condition 1 to condition 4. This is based on the fact that the limit of dissolution of the B element to 1 mol of the A element is about 5.4 mol. Moreover, the ratio of the amount of substance of cobalt to the amount of substance of the A element is set to 0.4 or less in the condition 1 in consideration of cost.

When the liquid retention volume, which is the volume of the electrolytic solution retained in the separator 14, is represented by V1, the true volume, which is the volume of the separator 14 in the case where no void exists in the separator 14 (namely, the volume that is occupied by the material itself that constitutes the separator), is represented by V2, the theoretical capacity of the negative electrode 13 is represented by C1, and the theoretical capacity of the positive electrode 12 is represented by C2, the separator 14 is constituted such that these values satisfy the following expression (1). The value of (V1/V2×C1/C2) in the following expression is hereinafter referred to as the design value D.

$$2.0 \leq V1/V2 \times C1/C2 \leq 3.1 \quad (1)$$

The values of the liquid retention volume V1 and the true volume V2 are derived using the separator 14 before being incorporated in the nickel-hydrogen storage battery 10. The value of the liquid retention volume V1 is obtained in the following manner. The dry weight (Wd), which is the weight of the separator in a dried state, and the total weight (Wg), which is the weight of the separator in a state of absorbing an electrolytic solution, are measured. The liquid retention weight (We), which is the weight of the electrolytic solution retained in the separator, is determined from the difference between the total weight (Wg) and the dry weight (Wd) (We=Wg−Wd). The liquid retention volume V1 is derived by dividing the liquid retention weight (We) by the density of the electrolytic solution (ρe) (V1=We/ρe). The true volume V2 is derived by dividing the dry weight (Wd) by the density of the separator, namely the density of a material constituting the separator (ρs) (V2=Wd/ρs).

The expression (1) shows a production condition of the separator according to the capacity ratio, which is the ratio of the theoretical capacity of the negative electrode to the theoretical capacity of the positive electrode. Namely, the expression (1) shows the production condition of the separator according to the extent of pulverization of the hydrogen-absorbing alloy during charging and discharging. In the nickel-hydrogen storage battery satisfying the expression (1), the shortage of the electrolytic solution is hard to occur even if the hydrogen-absorbing alloy is pulverized, and the increase in the internal resistance attributable to the pulverization of the hydrogen-absorbing alloy can be suppressed.

EXAMPLE

In the following Example, nickel-hydrogen storage batteries were produced under the following conditions, and the properties were evaluated.

A hydrogen-absorbing alloy powder was produced by the following method. Firstly, a misch metal was prepared in which 45 mass % of Ce, 30 mass % of La, 5 mass % of Nd and 20 mass % of other rare earth element(s) were alloyed. The misch metal, Ni, Co, Mn, and Al were blended in a prescribed formulation, then the composition was put into an arc melting furnace, the pressure was reduced, and the composition was melted. Furthermore, heat treatment was performed under an argon gas atmosphere at 1130° C. for a prescribed time, and the heat-treated composition was cooled to obtain a hydrogen-absorbing alloy. This is referred to as preparation of alloy by casting. The alloy was ground by a ball mill to produce an alloy powder.

Next, the alloy powder was immersed in an alkaline aqueous solution for 2 hours and the resultant mixture was stirred. Thereafter, the resultant mixture was washed with water and dried to obtain an alloy powder. Next, to the powder of the hydrogen-absorbing alloy, a polyvinyl alcohol aqueous solution having a concentration of 5 mass % was added, and the resultant mixture was kneaded to produce paste. The paste was applied to a punching metal, and the punching plate was dried, rolled, and cut to thereby produce a negative electrode. In the present Example, the Mm, Ni, Co, Mn, and Al were blended in a formulation of $MmAl_{0.4}Mn_{0.4}Co_{0.15}Ni_{4.25}$ to produce a negative electrode having a ratio of the amount of substance of the B element to the amount of substance of the A element of 5.2, a ratio of the amount of substance of cobalt to the amount of substance of the A element of 0.15, and a thickness of 350 µm.

With regard to the positive electrode, a foamed nickel was filled with active material paste whose main component was nickel hydroxide, and the foamed nickel was dried, rolled, and cut to thereby produce a positive electrode having a thickness of 500 µm. With regard to the separator, a polyolefin nonwoven fabric to which hydrophilic treatment was applied, the polyolefin nonwoven fabric having a thickness of 250 µm, was used. A cylindrical nickel-hydrogen storage battery having a theoretical capacity of the positive electrode of 5 Ah, a design value D of within a range of 1.8 or more and 3.2 or less was produced using the positive electrode, the negative electrode, and the separator.

Durability Test

Charge and discharge were performed at 20 A within a storage amount of charge (SOC) ranging from of 20 to 80% relative to the cell capacity, and DC-IR was measured by the following measurement method after 1500 cycles. When a nickel-hydrogen storage battery repeats charge and discharge, the internal resistance of the battery increases, and the smaller the amount of increase, the better, and it can be said that a battery having a smaller internal resistance after 1500 durability cycles is better in durability.

Measurement Method of Internal Resistance Value to Direct Current (DC-IR)

Charge is performed until the state of charge (SOC) reaches 50% relative to the cell capacity. After a pause of 10 minutes, discharge is performed at 10 A for 10 seconds. After a pause of one minute, discharge is performed at 50 A for 10 seconds. The DC-IR was calculated from a slope obtained by plotting the respective current values and voltages after 10 seconds.

Test Results

Figure 2:
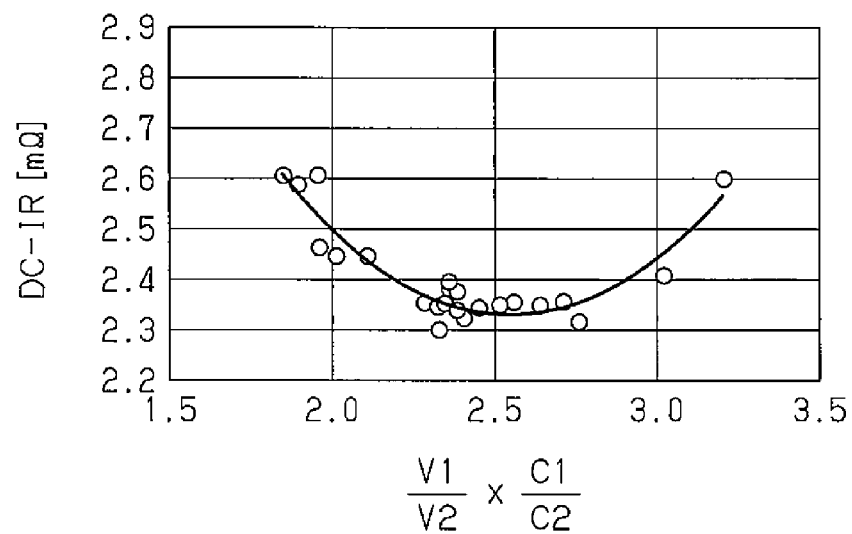
FIG. 2 is a graph illustrating one example of test results.

An example of the durability test results is shown in Table 1 and FIG. 2. The solid line in FIG. 2 is an approximate curve based on the results shown in Table 1. The DC-IR after the durability test in the range of 2.5 mΩ or less was evaluated as acceptable. The reason is based on the fact that the range of the DC-IR is set to 2.5 mΩ or less as the range where the requirement specification of a product relating to heat generation during charging and discharging or input/output electric power is satisfied.

TABLE 1

Durability test results in cylindrical nickel-hydrogen storage batteries having different design values D.

| No | V1 [cm³] | V2 [cm³] | C1/C2 | D | DC-IR [mΩ] |
|----|----------|----------|-------|------|------------|
| 1  | 7.1      | 5.08     | 1.32  | 1.84 | 2.61       |
| 2  | 6.7      | 5.08     | 1.43  | 1.88 | 2.59       |
| 3  | 6.9      | 5.08     | 1.43  | 1.95 | 2.61       |
| 4  | 6.9      | 5.08     | 1.43  | 1.96 | 2.47       |
| 5  | 7.1      | 5.08     | 1.43  | 2.01 | 2.45       |
| 6  | 7.3      | 4.8      | 1.38  | 2.10 | 2.45       |
| 7  | 7.6      | 4.4      | 1.27  | 2.28 | 2.36       |
| 8  | 7.8      | 4.4      | 1.27  | 2.32 | 2.35       |
| 9  | 8.2      | 4.4      | 1.25  | 2.33 | 2.3        |
| 10 | 7.8      | 4.4      | 1.25  | 2.34 | 2.35       |
| 11 | 7.9      | 4.4      | 1.25  | 2.35 | 2.4        |
| 12 | 8.2      | 4.95     | 1.43  | 2.36 | 2.38       |
| 13 | 8        | 4.4      | 1.43  | 2.38 | 2.38       |
| 14 | 8        | 4.4      | 1.43  | 2.38 | 2.34       |
| 15 | 8        | 4.4      | 1.32  | 2.40 | 2.32       |
| 16 | 7.7      | 4.4      | 1.39  | 2.45 | 2.34       |
| 17 | 8.2      | 4.68     | 1.43  | 2.51 | 2.35       |

TABLE 1-continued

Durability test results in cylindrical nickel-hydrogen storage batteries having different design values D.

| No | V1 [cm³] | V2 [cm³] | C1/C2 | D | DC-IR [mΩ] |
|---|---|---|---|---|---|
| 18 | 7.9 | 4.4 | 1.43 | 2.56 | 2.36 |
| 19 | 7.6 | 4.13 | 1.43 | 2.64 | 2.35 |
| 20 | 9.1 | 4.4 | 1.43 | 2.71 | 2.36 |
| 21 | 7.5 | 3.86 | 1.43 | 2.76 | 2.32 |
| 22 | 8.7 | 4.13 | 1.43 | 3.02 | 2.41 |
| 23 | 9 | 4.5 | 1.6 | 3.20 | 2.6 |

As shown in Table 1 and FIG. 2, it was confirmed that the DC-IR was 2.5 mΩ or less in the range where the design value D in the expression (1) was 2.0 or more and 3.1 or less. Namely, it was confirmed that the shortage of the electrolytic solution attributable to the pulverization of the hydrogen-absorbing alloy was hard to occur in the nickel-hydrogen storage battery satisfying the expression (1).

As shown in Table 1 and FIG. 2, it was confirmed that the DC-IR was 2.4 mΩ or less in the range where the design value D in the expression (1) was 2.2 or more and 2.8 or less. The reduction in input/output electric power can be suppressed, and the heat generation during charging and discharging can further be suppressed and thereby the life of the battery can be extended in the range where the DC-IR value was 2.4 mΩ or less. Namely, it can be said that the range where the design value is 2.2 or more and 2.8 or less is a more preferred range.

Next, operation of the nickel-hydrogen storage battery having the above-described constitution will be described.

With regard to the $AB_5$ based alloy, when the ratio of the amount of substance of the B element to the amount of substance of the A element is made large, the pulverization during charging can be suppressed, and therefore the internal resistance after the durability test becomes low. The negative electrode of the nickel-hydrogen storage battery used for one example of the durability test was produced from the hydrogen-absorbing alloy having the above-mentioned ratio of 5.2. When the negative electrode is produced from the hydrogen-absorbing alloy having a ratio of the amount of substance of the B element to the amount of substance of the A element of 5.2 or more, and the design value D in the expression (1) is in the range of 2.0 or more and 3.1 or less, test results similar to the above-described test results are obtained.

Moreover, cobalt in the $AB_5$ based alloy is a material added in order to suppress the pulverization of the hydrogen-absorbing alloy. The ratio of the amount of substance of cobalt to the amount of substance of the A material is 0.15 in the negative electrode of the nickel-hydrogen storage battery used for the durability test. When the negative electrode is produced from the hydrogen-absorbing alloy having a ratio of the amount of substance of cobalt to the amount of substance of the A element of 0.15 or more, and the design value D is in the range of 2.0 or more and 3.1 or less, test results similar to the above-described test results are obtained.

Therefore, the nickel-hydrogen storage battery is designed such that the $AB_5$ based hydrogen-absorbing alloy satisfies the following condition (a) to the condition (c) and the design value D in the expression (1) falls within the range of 2.0 or more and 3.1 or less to thereby suppress the increase in the internal resistance attributable to the pulverization of the hydrogen-absorbing alloy.

(a) The A element is a constituent element of a misch metal, the main component of the B element is nickel, and a part of nickel is substituted by another element including cobalt.

(b) The ratio of the amount of substance of the B element to the amount of substance of the A element is 5.2 or more and 5.4 or less.

(c) The ratio of the amount of substance of cobalt to the amount of substance of the A element is 0.15 or more and 0.4 or less.

From Japanese Laid-Open Patent Publication No. 2008-166027, it has been confirmed that the DC-IR after the durability test is 2.5 mΩ or less for the condition 2 to the condition 4 of the above-described hydrogen-absorbing alloy without considering the design value D. It has been confirmed that the internal resistance of the nickel-hydrogen storage battery is suppressed by designing the nickel-hydrogen storage battery so as to satisfy the expression (1) in the Example. Therefore, the nickel-hydrogen storage battery that satisfies any one of the condition (2) to the condition (4) is design so as to further satisfy the expression (1) to thereby further suppress the increase in the internal resistance.

According to the Example, the nickel-hydrogen storage battery in which the internal resistance is suppressed in the case where the nickel-hydrogen storage battery satisfies the expression (1) includes a nickel-hydrogen storage battery having a capacity ratio of 1.2 or more and 1.35 or less. Namely, the increase in the internal resistance can be suppressed in the nickel-hydrogen storage battery that satisfies any one of the condition (1) to the condition (4) and satisfies the expression (1) even when the capacity ratio is set to 1.2 or more and 1.35 or less. As a result thereof, the weight energy density is improved and the amount of cobalt used is reduced.

As described above, according to the nickel-hydrogen storage battery of the embodiment, the advantages as listed below can be obtained.

(1) In the nickel-hydrogen storage battery using the hydrogen-absorbing alloy satisfying any one of the condition 1 to the condition 4, the positive electrode, negative electrode, and separator are designed so as to satisfy the expression (1) and thereby the increase in the internal resistance attributable to the pulverization of the hydrogen-absorbing alloy is suppressed.

(2) In the nickel-hydrogen storage battery satisfying the design value D of 2.2 or more and 2.8 or less in the expression (1), the increase in the internal resistance attributable to the pulverization of the negative electrode is further suppressed. As a result thereof, the heat generation of the nickel-hydrogen storage battery is suppressed and thereby the life of the nickel-hydrogen storage battery can be improved. Moreover, the input/output electric power to the nickel-hydrogen storage battery can be increased.

(3) The weight energy density is improved, and the cost is reduced by the reduction in the amount of cobalt used while the increase in the internal resistance attributable to the pulverization of the negative electrode is suppressed by the capacity ratio set to 1.2 or more and 1.35 or less.

The embodiment may be modified as illustrated below.

The capacity ratio, which is the ratio of the theoretical capacity of the negative electrode to the theoretical capacity of the positive electrode, may take a value of less than 1.2, or more than 1.35 as long as the expression (1) is satisfied.

The formulation of the B element in the $AB_5$ based hydrogen-absorbing alloy is not limited to the formulation described in the embodiment, and the proportion of Al, Mn, Co, and Ni may be changed.

The nickel-hydrogen storage battery is not limited to the cylindrical closed nickel-hydrogen storage battery whose case is cylindrical and may be a rectangular closed type nickel-hydrogen storage battery or a module battery in which a plurality of single batteries are combined.

The invention claimed is:

1. A nickel-hydrogen storage battery comprising a positive electrode, a negative electrode using an AB5 based hydrogen-absorbing alloy, and a separator arranged between the positive electrode and the negative electrode, wherein
the $AB_5$ based hydrogen-absorbing alloy includes an A element, which is a constituent element of a misch metal, and a B element,
the B element includes nickel and cobalt,
a ratio of an amount of substance of the B element to an amount of substance of the A element is 5.2 or more and 5.4 or less,
a ratio of an amount of substance of cobalt to the amount of substance of the A element is 0.15 or more and 0.4 or less, and
a liquid retention volume (V1), which is a volume of an electrolytic solution retained in the separator, a true volume (V2), which is a volume of the separator in the case where no void exists in the separator, a theoretical capacity of the negative electrode (C1), and a theoretical capacity of the positive electrode (C2) satisfy the expression (1).

$$2.0 \leq V1/V2 \times C1/C2 \leq 3.1 \tag{1}$$

2. The nickel-hydrogen storage battery according to claim 1, wherein
the ratio of the amount of substance of the B element to the amount of substance of the A element is 5.25 or more and 5.4 or less,
the ratio of the amount of substance of cobalt to the amount of substance of the A element is 0.15 or more and 0.25 or less, and
a ratio of a half-width of a peak of a (002) plane to a half-width of a peak of a (200) plane in X-ray diffraction is 1.3 or more and less than 1.7.

3. The nickel-hydrogen storage battery according to claim 1, satisfying the expression (1').

$$2.2 \leq V1/V2 \times C1/C2 \leq 2.8 \tag{1'}$$

4. The nickel-hydrogen storage battery according to claim 1, wherein a capacity ratio (C1/C2), which is a ratio of the theoretical capacity of the negative electrode (C1) to the theoretical capacity of the positive electrode (C2), satisfy the expression (2).

$$1.2 \leq C1/C2 \leq 1.35 \tag{2}$$

5. A nickel-hydrogen storage battery comprising a positive electrode, a negative electrode using an AB5 based hydrogen-absorbing alloy, and a separator arranged between the positive electrode and the negative electrode, wherein
the $AB_5$ based hydrogen-absorbing alloy includes an A element, which is a constituent element of a misch metal, and a B element,
the B element includes nickel and cobalt,
a ratio of an amount of substance of the B element to an amount of substance of the A element is 5.25 or more and 5.4 or less,
a ratio of an amount of substance of cobalt to the amount of substance of the A element is 0.05 or more and 0.15 or less,
a ratio of a half-width of a peak of a (002) plane to a half-width of a peak of a (200) plane in X-ray diffraction is 1.1 or more and less than 1.3, and
a liquid retention volume (V1), which is a volume of an electrolytic solution retained in the separator, a true volume (V2), which is a volume of the separator in the case where no void exists in the separator, a theoretical capacity of the negative electrode (C1), and a theoretical capacity of the positive electrode (C2) satisfy the expression (1).

$$2.0 \leq V1/V2 \times C1/C2 \leq 3.1 \tag{1}$$

6. A nickel-hydrogen storage battery comprising a positive electrode, a negative electrode using an AB5 based hydrogen-absorbing alloy, and a separator arranged between the positive electrode and the negative electrode, wherein
the $AB_5$ based hydrogen-absorbing alloy includes an A element being a constituent element of a misch metal, and a B element,
the B element includes nickel and cobalt,
a ratio of an amount of substance of the B element to an amount of substance of the A element is 5.30 or more and 5.4 or less,
a ratio of an amount of substance of cobalt to the amount of substance of the A element is 0.05 or more and 0.15 or less,
a ratio of a half-width of a peak of a (002) plane to a half-width of a peak of a (200) plane in X-ray diffraction is 1.1 or more and less than 1.9, and
a liquid retention volume (V1), which is a volume of an electrolytic solution retained in the separator, a true volume (V2), which is a volume of the separator in the case where no void exists in the separator, a theoretical capacity of the negative electrode (C1), and a theoretical capacity of the positive electrode (C2) satisfy the expression (1).

$$2.0 \leq V1/V2 \times C1/C2 \leq 3.1 \tag{1}$$

* * * * *